July 26, 1960    G. L. STECK    2,946,118
METHOD OF REPAIRING DENTS
Filed Dec. 22, 1955
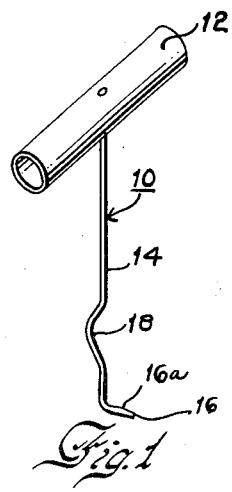
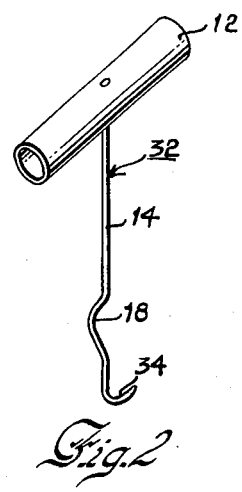
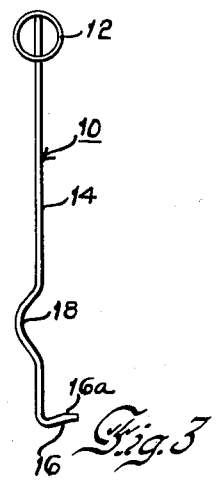
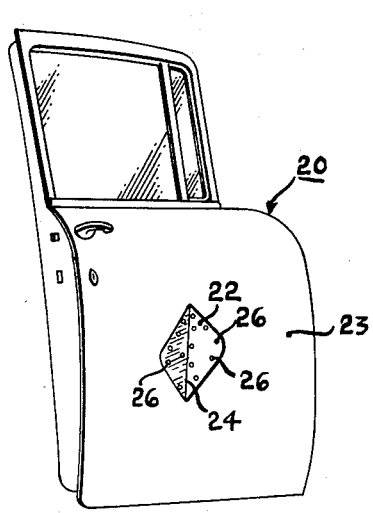
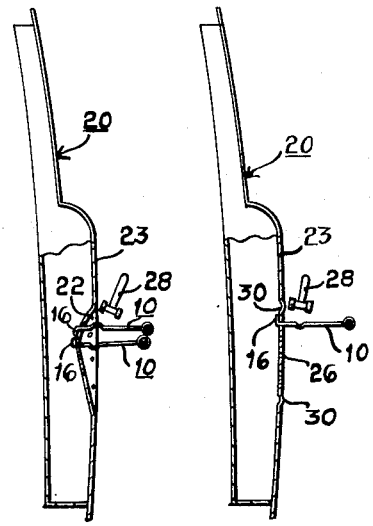
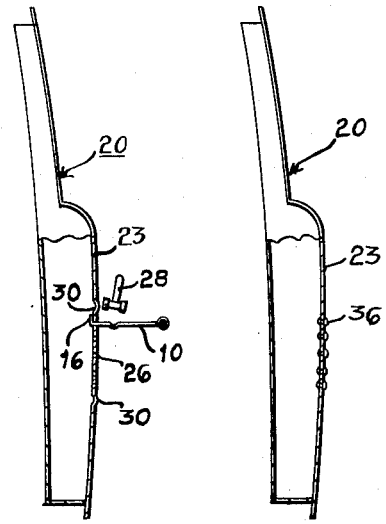
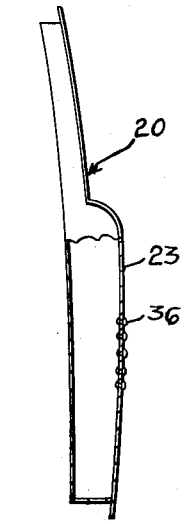
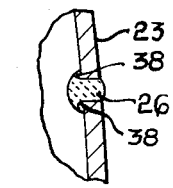
INVENTOR.
George L. Steck
BY
HIS ATTORNEY

United States Patent Office 2,946,118
Patented July 26, 1960

2,946,118

METHOD OF REPAIRING DENTS

George L. Steck, 1312 Bolander Ave., Dayton 8, Ohio

Filed Dec. 22, 1955, Ser. No. 554,770

5 Claims. (Cl. 29—401)

This invention relates to a process for metal working, and more particularly for smoothing wrinkled sheet metal surfaces, although not necessarily so limited.

This invention evolved from efforts to simplify the task of straightening dents and wrinkles in automobile bodies. Ordinarily, the mechanic straightens automobile body dents with a mallet and a hand-held anvil; but, in so doing, must have access to both sides of the damaged portion of the body. When the damaged body portion is a door, or a roof panel, for example, it is necessary that the interior upholstery be removed from the panel before the metal can be worked into shape. Thus, the costs of body repair are increased through the need to remove and replace interior upholstery.

An object of this invention is to provide a process for straightening dents in sheet metal, wherein access to only one side of the sheet is required.

A further object of this invention is to provide a process for straightening dents in sheet metal, wherein the sheet metal surface is first weakened to facilitate the straightening operation, then restored to substantially its original mechanical strength.

Other objects and advantages reside in the construction of parts, the combination thereof and the mode of operation, as will become more apparent from the following description.

In the drawings:

Figure 1 is a perspective view of a tool for engaging sheet metal panels.

Figure 2 is a perspective view of a modification of the tool.

Figure 3 is a side elevational view of the tool of Figure 1.

Figure 4 is a perspective view of an automobile door having a deformation in the surface thereof. A plurality of holes have been drilled in the deformed area.

Figure 5 is a cut-away side elevational view of the automobile door illustrating a step of the metal working process of this invention.

Figure 6 is a cut-away side elevational view of the automobile door illustrating another step of the process.

Figure 7 is a cut-away side elevational view of the automobile door wherein the holes drilled in the door have been plugged with solder.

Figure 8 is an enlarged view of one of the solder filled holes of Figure 7.

Referring to the drawings in detail, a tool 10 used in the metal working process of this invention is shown in Figures 1 and 3. The tool 10 comprises a cylindrical handle portion 12 to which is attached a shaped metal rod 14 which is of high tensile strength. The handle portion 12 illustrated is a short length of tubular metal, steel for example; however, any shape suitable for gripping by hand and any material of suitable structural strength may be used for the handle portion. The rod 14 is joined at one end thereof to the handle portion 12 by brazing, or in any other suitable manner to insure a strong bond therebetween.

The rod 14 has been bent adjacent its other end to substantially a right angle so as to form an anvil portion 16. The anvil portion has an arched portion 16a intermediate the end thereof and the right angle bend in the rod. Intermediate the anvil portion and the handle portion, the rod 14 has been bent to form an arcuate bend 18 therein, the bend 18 providing for resilient movement of the anvil portion 16 relative to the handle portion 12.

The metal working process for which the tool 10 has been developed is illustrated in Figures 4 through 7. A dented or deformed automobile door 20 is shown in Figure 4. The dent 22 illustrated is of the type encountered when an automobile door is thrust against an upright post, the post pushing the door panel 23 inwardly substantially along the line 24.

In the first step in the repair of such a dent, a plurality of holes 26 are drilled in the dented area along the periphery of the dent 22 and along the line 24 representing the deepest penetration of the dent 22 into the door 20. The location of the holes 26 is somewhat arbitrary, the repairman being guided primarily by his past experience. In general, however, the holes should be located where the curvature of the dented surface is greatest, the concentration of holes increasing with increasing curvature. Except where the metal panel has actually been kinked, the holes need not be placed closer together than twice the length of the anvil portion 16 of the tool 10. This distance is approximately one inch.

In the second step, a pair of tools 10 are inserted into holes 26 along the line 24 at the region of deepest penetration of the dent 22. The dent 22 is then pulled outwardly with the tools 10 by pulling on both tools at the same time. Ordinarily, the force one man can exert by pulling on the tools is insufficient to affect the dent. However, by holding both tools with one hand and striking the periphery of the dent with a padded mallet 28 held in the other hand, considerable force may be applied to the dented metal. In this operation, shown in Figure 5, the tools 10 are the equivalent of a hand-held anvil, the arched portion 16a abutting the sheet metal at a point removed from the holes 26, so that the tools 10 will not tend to tear the metal adjacent each hole. Frequently, one or two blows with the mallet are sufficient to cause the dented area to snap into alignment with the surface of the panel 23 leaving only small irregularities 30 around the perimeter of the dent 22, as shown in Figure 6. The padded mallet 28 may be, for example, an ordinary steel hammer, the head of which is covered with a protective layer of masking tape or the like.

Two tools used simultaneously have been recommended for the above step in the metal working process for the following reasons. First, each tool 10 will have a tendency to create a localized deformity in the metal surface where the arched portion 16a of the anvil portion 16 contacts the metal. This tendency is only half as great when two tools are used. Secondly, each impact of the mallet 28 will be transmitted to the rods 14 of each tool. By dividing the force of this impact between two tools, the chances of tool breakage are reduced.

The arcuate bend 18 is placed in each tool 10 to extend the useful life of the tool. Without this arcuate bend, the tool exhibits a pronounced tendency to break at the right angle bend adjacent the anvil portion 16 under the impact of the mallet 28. The arcuate bend, when present in the rod 14, absorbs the impact of the mallet.

The next step in the metal working process after the dented area 22 has been brought into alignment with the surface of the panel 23 involves smoothing out the surface irregularities 30 in the panel. These irregularities are worked out using a tool 10 and a mallet, engaging depressed areas with the tool and simultaneously pounding out high areas with the mallet, as shown in Figure 6. For detail work adjacent each hole 26, a modified tool 32 has been developed.

The tool 32, like the tool 10, comprises a handle portion 12, and a rod 14, having an arcuate bend 18 therein. The tools 10 and 32 differ only in the shape of the anvil portions. The tool 32 has an anvil portion 34 which is shorter than the anvil portion 16 and which arches in the direction of the handle portion 12. Thus, with the tool 32, the repairman is able to impress a localized force on the metal surface adjacent each hole 26.

After the dented area 22 has been straightened out, as illustrated in Figure 7, it remains to plug the holes 26. This is accomplished with a conventional soldering iron (not shown). The tip of a hot soldering iron is seated in the hole 26 with the body of the iron projecting normal to the surface of the panel 23. Flux core solder is introduced in the hole 26 to "tin" the walls of the hole while the iron is held in place to heat the adjacent metal. Following this, additional solder is applied liberally and allowed to flow into the hole 26. Finally, the iron is jerked from the hole. A small globule of solder 36 will remain in the hole.

The solder globule 36 adheres to the wall of the hole 26 and will also envelop a burr 38 on the back side of the panel which was created by drilling the hole 26. An enlarged sectional view of the solidified globule is shown in Figure 8.

The final steps in repairing the panel 23 include sanding the solder globules 36, so they are flush with the panel surface and repainting the surface.

Although the various steps in the metal working process described herein have been applied to a specific type of dent, it is not intended to thereby limit the application of this process. Clearly, with skill acquired through practice, a repairman can repair any dented or wrinkled sheet metal surface with this process.

The practice of drilling holes in the sheet metal surface may, at first, appear inadvisable, in that it may be detrimental to the strength and appearance of the repaired surface. The structural strength of the repaired surface as a whole is not materially reduced, however, since the area of metal removed by drilling is negligible compared to the total surface area of the dent. (Typically $\%_{64}$ inch holes are drilled approximately one inch apart. Thus, the material removed by drilling constitutes less than 2% of the area of the dent.)

By concentrating the drilled holes at points where the curvature of the dented surface is greatest, the metal is weakened where bending of the metal must be effected in order to straighten the dent. Thus, the presence of these small holes 26 facilitates the straightening process.

The solder globules 38 replenish to some extent the structural strength of the weakened areas. The probability that a solder globule can be knocked out of its hole is exceedingly small. If the diameter of the hole is limited to $\%_{64}$ inch or less, a pointed shaft can be driven through the globule after sanding, without knocking the globule from the hole.

There are many advantages inherent in this metal working process that are not apparent from the above description. For example, there is no necessity for removing the damaged panel from the automobile or other vehicle in order to repair dents. Further, the repairman is not required to assume awkward positions in order to hammer out dents against a hand-held anvil. Whereas, some repair techniques require two men do the job, one man working alone can straighten dents using this process.

The repairman frequently relies on surface reflections as a guide to straightening out small surface irregularities. The paint is preferably left intact until after the dent has been straightened, for the reason that the light is better reflected from the painted surface than from an unpainted metal surface. After the dent has been removed, the paint may then be removed, the surface polished and repainted. In many other metal working processes, this practice is limited because the repairman must observe reflections on one side of the panel and hammer out depressions from the other side of the panel. The present metal working process enables full use of the surface reflection technique, since the repairman can observe the surface reflections as he works the metal.

Although the preferred embodiment of the process and the tool for carrying out the process have been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. The process of working a deformed metal sheet with a mallet and tools having anvil portions, said process including the steps of drilling holes in the metal sheet, inserting the anvil portions of the tools in the holes, pulling the metal of the sheet outwardly with the tools while simultaneously pounding the metal remote from said tools inwardly with the mallet, repeating the above operation by inserting the tools into other holes until the sheet is worked to the desired contour, and filling the drilled holes with solder.

2. The process of working a deformed metal sheet with a mallet and a tool having an anvil portion, said process including the steps of drilling holes in the deformed area of the metal sheet, inserting the anvil portion of the tool in one of said holes, pulling one portion of the metal sheet outwardly with the tool while simultaneously pounding another portion of the sheet inwardly with the mallet, repeating the above operation by inserting the tool into other holes until the sheet is worked to the desired contour and filling the holes previously drilled in the sheet.

3. The process of working a deformed metal sheet with a mallet and tools having variously shaped anvil portions, said process including the steps of drilling holes in the deformed area of the metal sheet, inserting the anvil portion of one of said tools in one of said holes, pulling the metal sheet outwardly with the tool while simultaneously pounding the sheet inwardly with the mallet at a point spaced from said tool, repeating the above step with differently shaped anvil portions and using other holes as required until the sheet has been worked to the desired contour, and filling the holes previously drilled in the sheet.

4. The process of removing dents in a metal sheet with a mallet and a tool having an anvil portion, said process including the steps of drilling a hole in a dented portion of the sheet, inserting the anvil portion of the tool in said hole, and pulling the metal of the sheet outwardly with the tool while simultaneously pounding the periphery of the dented portion inwardly with the mallet.

5. The process of removing a dent in a metal sheet including the steps of engaging a portion of the sheet inside the periphery of a dent therein with a tool, pulling said tool to exert an outward force on said portion, and simultaneously actuating inwardly upon the peripheral portion of said dent with an impact delivering tool.

References Cited in the file of this patent

UNITED STATES PATENTS

| | | |
|---|---|---|
| 1,309,033 | Irwin | July 8, 1919 |
| 2,000,599 | Leake | May 7, 1935 |
| 2,065,461 | Johnson | Dec. 22, 1936 |
| 2,120,525 | McKerihan | June 14, 1938 |
| 2,252,986 | Scott | Aug. 19, 1941 |
| 2,606,469 | Morganthaler | Aug. 12, 1952 |
| 2,676,503 | Back | Apr. 27, 1954 |
| 2,692,425 | Martin | Oct. 26, 1954 |
| 2,749,795 | Boykin | June 12, 1956 |